United States Patent [19]

Uetani et al.

[11] 4,101,719
[45] Jul. 18, 1978

[54] SILVER(II) OXIDE CELL AND ITS MANUFACTURE

[75] Inventors: Yoshio Uetani; Akio Shimizu; Kozo Kajita; Hiroshi Ishiuchi; Tadashi Goryo; Kazuo Ishida, all of Ibaraki, Japan

[73] Assignee: Hitachi Maxell, Ltd., Ibaraki, Japan

[21] Appl. No.: 816,804

[22] Filed: Jul. 18, 1977

[30] Foreign Application Priority Data

Jul. 16, 1976 [JP] Japan .................................. 51-85470
Jul. 16, 1976 [JP] Japan .................................. 51-85471
Jul. 16, 1976 [JP] Japan .................................. 51-85472

[51] Int. Cl.$^2$ .......................................... H01M 10/32
[52] U.S. Cl. ................................... 429/206; 429/219
[58] Field of Search ............... 429/219, 218, 209, 206; 252/182.1; 423/604

[56] References Cited

U.S. PATENT DOCUMENTS

| | | | |
|---|---|---|---|
| 3,615,858 | 10/1971 | Soto-Krebs | 429/219 X |
| 3,853,623 | 10/1974 | Davis | 429/219 X |
| 3,907,598 | 9/1975 | Megahed | 429/206 |
| 4,003,757 | 1/1977 | Lux et al. | 429/219 |
| 4,009,056 | 2/1977 | Megahed et al. | 429/219 X |

*Primary Examiner*—Anthony Skapars
*Attorney, Agent, or Firm*—Birch, Stewart, Kolasch and Birch

[57] ABSTRACT

A silver(II) oxide cell which comprises a positive electrode comprising a shaped body of silver(II) oxide as a positive active material, a negative electrode comprising zinc as a negative active material and an alkaline electrolyte, characterized in that the shaped body is a molding product of a composition comprising particles of which each particle comprises a core part of silver(II) oxide and a surface part of silver(I) oxide integrally and continuously provided around the core part, the weight ratio of the silver(II) oxide and the silver(I) oxide being from about 70 : 30 to 90 : 10. Such silver(II) oxide cell has large discharge capacity and shows a flat and even discharge characteristics without any substantial deterioration in performances on storage.

22 Claims, 12 Drawing Figures

SILVER(II) OXIDE CELL AND ITS MANUFACTURE

BACKGROUND AND SUMMARY OF THE INVENTION

The present invention relates to a silver(II) oxide cell and its manufacture. More particularly, it relates to improvements in silver(II) oxide cells comprising silver(II) oxide as the positive active material and an alkaline solution as the electrolyte.

Advantageously, the silver(II) oxide cell provided by this invention has a large discharge capacity and shows flat and even discharge characteristics without any substantial deterioration in performances on storage. Further, it has a low internal resistance and, even in case of a high rate discharge, can show a high closed circuit voltage.

Attempts have heretofore been made to use silver(II) oxide as a positive active material for alkaline cells, since silver(II) oxide has a larger theoretical discharge capacity than various other materials as shown in the following table:

| Positive active material | Theoretical discharge capacity | |
|---|---|---|
|  | mAH/ml | mAH/g |
| AgO | 3222 | 433 |
| $Ag_2O$ | 1650 | 231 |
| $MnO_2$ | 1901 | 378 |
| HgO | 2752 | 247 |

Figure 1:
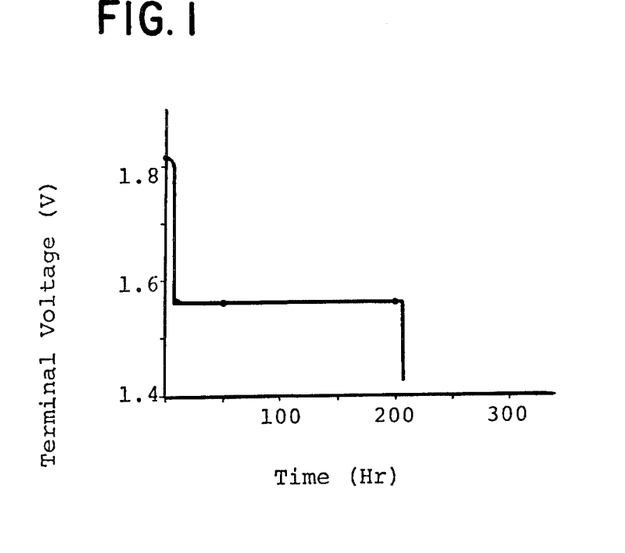
FIG. 1 illustrates variation of the terminal voltage with discharge time.

However, silver(II) oxide shows the discharge voltages in two steps due to its discharge reaction as follows: $Ag^{++} \rightarrow Ag^+ \rightarrow Ag$. For instance, in FIG. 1, of the accompanying drawings which shows the variation of the terminal voltage with the discharge time on the discharge of a cell of Type G12 (JIS (Japanese Industrial Standard)) or Size 43 (IEC (International Electrochemical Commission)) using silver(II) oxide itself as the positive active material with a loading resistance of 2 kΩ, the discharge curve has a higher voltage part of about 1.8 V and a lower voltage part of about 1.5 V. Such unflatness in the discharge voltage is unfavorable for use as a positive active material for an electric source of constant voltage in electronic wrist watches, hearing aids, measuring instruments and the like.

In addition, silver(II) oxide is apt to be decomposed in an alkaline electrolyte, and a large deterioration of the discharge characteristics is seen on the storage of a cell comprising silver(II) oxide as the positive active material. The gas ($O_2$) evolved on the decomposition of silver(II) oxide provides the increase of the internal pressure in the cell, which causes the leakage of the electrolyte and/or induces the deformation or rupture of the cell. Further, the evolved gas leads to the inactivation of the negative active material and/or the deterioration of the electrolyte or the separator.

In order to overcome the above drawbacks, there have been made some proposals including: (1) chemical or electro-chemical reduction of a molded product of particles of silver(II) oxide in an appropriate shape to make a thin layer of silver(I) oxide at the surface; (2) application of a binding agent comprising silver(I) oxide onto the surface of a molded product of particles of silver(II) oxide in an appropriate shape to form a coating layer comprising silver(I) oxide; (3) insertion of a molded product of particles of silver(II) oxide into a can wherein a metal (e.g. zinc, copper, nickel, silver) readily oxidizable with silver(II) oxide is plated on the inner surface or a screen made of the said metal is accommodated to contact closely to the inner surface, whereby silver(I) oxide is produced at the interface between the molded product and the metal plated layer or the screen; and (4) vapor-plating or spattering silver on the surface of a molded product of particles of silver(II) oxide to form a silver plated layer and oxidizing the silver plated layer with the silver(II) oxide to make a thin layer of silver(I) oxide, etc.

In method (1), however, the formed thin layer of silver(I) oxide has many micropores, and therefore the alkaline electrolyte penetrates through such micropores into the inner part of the molded product. Thus, the electrolyte contacts directly to silver(II) oxide, whereby the latter is decomposed to cause the depression of the discharge capacity.

In method (2), the application of a binding agent comprising silver(I) oxide onto the molded product usually produces a coating having pinholes or unevenness, and a satisfactory effect is hardly obtainable. Further, in case of the binding agent having functional groups such as hydroxyl or carboxyl, silver(II) oxide is reduced on contact with them so that the discharge capacity is decreased. Furthermore, on admixing silver(I) oxide with the binding agent or applying the resultant mixture onto the surface of the molded product, the silver(I) oxide is readily reacted with carbon dioxide in the air to give silver carbonate, which may result in the deterioration of the electrolyte or the inactivation of the negative active material.

In method (3), the surface of the molded product is uneven so that silver(1) oxide is produced at the convex portions which contact with the metal plated layer or the screen but not at the concave portions which do not contact with them. Thus, the entire molded product can not be completely covered by silver(I) oxide.

In method (4), the silver plated layer sometimes has pinholes, through which the electrolyte penetrates into the inner part of the molded product so as to cause the decomposition of silver(II) oxide. The formation of the pinholes can be prevented by making the silver plated layer thick but, in such case, the penetration of the electrolyte into the molded product to contact with the silver(I) oxide under the silver plated layer is prevented so that any discharge reaction will not proceed.

As the result of the extensive study, it has now been found that the use of a molded product of particles, each particle comprising a core part of silver(II) oxide and a surface part of silver(I) oxide integrally and continuously provided thereon, can overcome the said drawbacks as seen in the conventional methods. This invention is based on the above finding.

The several figures of the drawing illustrate.

Figure 2:
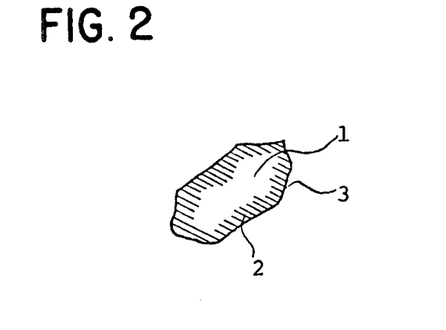
FIG. 2 is a schematic section of a particle.

As stated above, the silver(II) oxide cell of the present invention is characteristic in having as the positive electrode body a molded product of a composition comprising particles, of which each particle comprises a core part of silver(II) oxide and a surface part of silver(I) oxide integrally and continuously provided thereon. Thus, each of the particles used for the manufacture of the positive electrode body has a two layered structure as seen in FIG. 2, which shows an enlarged, schematic section view of one particle. In this Figure, the particle 3 comprises the core part (i.e. the central part) 1 consisting essentially of silver(II) oxide, and the surface part 2 integrally and continuously provided around the said core part and consisting essentially of silver(I) oxide.

On the discharge, the silver(I) oxide at the surface layers of the particles is contacted with the alkaline electrolyte to convert into metallic silver, which is then oxidized with the silver(II) oxide in the core parts again to silver(I) oxide, whereby the discharge voltage at the positive electrode is maintained at a constant level. When the silver(II) oxide and then the silver(I) oxide are consumed, the discharge performance is lost. As understood from such discharge mechanism, a larger proportion of the silver(II) oxide to the silver(I) oxide can assure a larger discharge capacity. When, however, the said proportion is too large, the higher voltage of the silver(II) oxide appears, and flat and even discharge characteristics are not obtainable. For assurance of a sufficient discharge capacity without the appearance of the higher voltage due to the silver(II) oxide, the weight ratio of the silver(II) oxide and the silver(I) oxide may be preferably from 70 : 30 to 90 : 10. In the case of the proportion of the silver(I) oxide being excessive over the said range, the resulting cell has an insufficient discharge capacity in the positive electrode, and there may be produced a state that the discharge capacity at the positive electrode is consumed but the negative electrode is still dischargeable, whereby the evolution of the gas($H_2$) is caused at the final stage of discharge.

For preparation of silver(II) oxide, there are known various procedures, of which typical examples are an anodic oxidation process which comprises the step of electrolysis using a solution of a silver salt (e.g. silver nitrate) as the electrolyte and platinum nets as the positive electrode and the negative electrode to deposit silver oxide onto the positive electrode, an ozone oxidation process which comprises the step of introduction of ozone into a solution of a silver salt to produce colloidal fine particles of silver oxide, a chemical oxidation process which comprises the step of treatment of a solution of a silver salt with an oxidizing agent in the presence of an alkali to give silver oxide, etc. Among them, the anodic oxidation process and the ozone oxidation process afford usually silver salts of oxygen acids (e.g. $Ag_6O_8 \cdot AgNO_3$) as the major component, and therefore the additional step of heat treatment for converting them into silver(II) oxide is necessary. Thus, the operation in such processes is troublesome and not suitable for industrial adoption. In addition, the yield of silver(II) oxide in these processes is low. On the other hand, the chemical oxidation process produces silver(II) oxide directly, and therefore the heat treatment step as required in the said other processes is unnecessary and the yield of the silver(II) oxide is excellent. Thus, the adoption of the chemical oxidation process is the most recommended, although the said other processes may be also adopted.

When the silver(II) oxide is produced according to the chemical oxidation process, a silver salt is subjected to oxidation with an oxidizing agent, usually in an aqueous alkaline medium. As in the case of the silver salt, any water-soluble silver salt may be used, but the most ordinary is silver nitrate. Examples of the oxidizing agent are persulfates such as potassium persulfate ($K_2S_2O_8$), permanganates such as potassium permanganate ($KMnO_4$), chlorites such as sodium chlorite ($NaClO_2$), etc. Among them, the use of persulfates is particularly preferred, since the objective silver (II) oxide is obtainable in a better yield and a higher purity.

The weight proportion of the silver salt, the oxidizing agent and the alkali to be used in the chemical oxidation process may be appropriately varied with the different kinds. When, for instance, the silver salt is silver nitrate and the oxidizing agent is a persulfate (e.g. sodium persulfate, potassium persulfate), the molar ratio of the silver nitrate, the persulfate and the alkali (e.g. sodium hydroxide, potassium hydroxide) may be about 1 : 0.7 - 2.0 : 2.4 - 5.0. Under such conditions, the silver nitrate and the alkali may be employed in concentrations of about 0.2 to 5 mol/L and about 0.8 to 2.0 mol/L, respectively.

On preparation of the silver(II) oxide, the inclusion of a water-soluble gold compound such as gold hydroxide in the reaction system can be a product containing gold. The presence of gold in the silver(II) oxide is effective in producing a positive active material having a higher stability in an alkaline electrolyte. The content of gold may be usually not more than 1% by weight to the silver(II) oxide.

The particle size and distribution of the silver(II) oxide can be regulated by the control of the concentrations of the silver salt, the oxidizing agent and the alkali in the reaction system, the reaction temperature, the reaction time, the curing time and the like in the production of the silver(II) oxide. The preferred particles of the silver(II) oxide are those that comprises from about 1 $\mu$ to 10 $\mu$ in particle size in a content of not less than about 90% by weight and have an average particle size of about 1.5 to 2.5 $\mu$.

For the use of the particles of silver(II) oxide as the positive active material in the present invention, it is necessary to convert the silver(II) oxide into silver(I) oxide at the surface parts of the particles. The conversion may be accomplished by various procedures, among which the most recommended is thermal decomposition. Thus, heating of the particles of silver(II) oxide in an inert atmosphere such as nitrogen results in the decomposition of the silver (II) oxide to silver(I) oxide. In order to obtain particles comprising a core part of about 70 to 90% by weight of silver(II) oxide and a surface part of about 30 to 10% by weight of silver(I) oxide, heating may be carried out, for instance, at a temperature of from about 60° to 150° C for about several to several tens hours. A lower temperature needs a longer time. But, a higher temperature makes it difficult to control the progress of the decomposition so as to stop the conversion at an appropriate stage. Because of this reason, heating at about 100° C for 13 to 16 hours is the most preferable.

Other examples of the procedure for the conversion are reduction using a reducing agent such as formaldehyde, glycerol, glucose or sodium thiosulfate, reduction with a reductive gas such as hydrogen gas, electrochemical reduction, etc. Among these reduction procedures, preferable are reduction with glycerol or glucose in an alkaline solution usually at room temperature and reduction by irradiation with a light source having wavelengths in a visible region (from about 4000 to 8000 Å) and/or in an infrared region (more than about 8000 Å) excluding those in an ultraviolet region (less than about 4000 Å).

The silver(I) oxide layer thus formed at the surface parts of the silver(II) oxide particles has a property of easily adsorbing carbon dioxide in the air. The use of the particles adsorbed carbon dioxide thereon as the positive active material may cause the deterioration of the alkaline electrolyte and the inactivation of the negative active material in the resulting cell. Because of this reason, the application of any effective measure for elimination of adsorbed carbon dioxide to the particles is favorable. One of the effective measures comprises immersing the particles in boiling water for about 1 to 5 hours so as to dissolve the carbon dioxide into the water. Another effective measure comprises immersing the particles in an aqueous solution of an alkali or alkaline earth metal hydroxide (e.g. sodium hydroxide, potassium hydroxide, calcium hydroxide, hydroxide, barium hydroxide) for 1 to 5 hours to dissolve the adsorbed carbon dioxide into the solution and convert the same into a carbonate. Still, the above measure for elimination of carbon dioxide once adsorbed may be applied to the particles after molding into an appropriate shape as hereinafter described.

Usually, a positive active material is admixed with any electroconductive aid prior to its molding into an appropriate form. The most popular electroconductive aid is a carbonaceous material such as graphite, acetylene black or active carbon. In case of the positive active material comprising silver(I) oxide and silver(II) oxide of the present invention, however, the incorporation of such carbonaceous material as th electroconductive aid into the positive active material results unfavorably in the acceleration of the decomposition of the positive active material in the presence of an alkaline electrolyte, whereby the discharge time is shortened.

Figure 3:
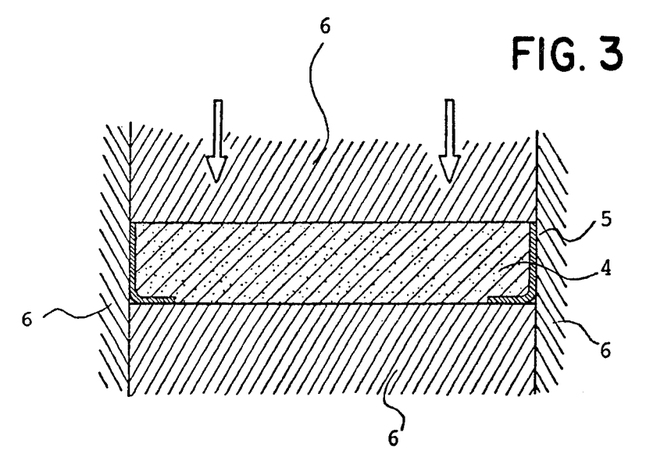
FIG. 3 illustrates compression molding.

Because of the above reason, the positive active material may be preferably compression molded along and as such, i.e. without incorporation of any carbonaceous material therein, into an appropriate shape, which serves as a positive electrode body. In this case, not only the stability of the positive active material but also the discharge capacity of the positive electrode body can be enhanced. The silver(II) oxide cell manufactured with such positive electrode body is particularly useful for electronic wrist watches and other discharge articles with a small loading resistance. Alternatively, the positive active material may be admixed with any non-carbonaceous electroconductive aid such as a metal (e.g. silver, gold) or a metal oxide (e.g. lead oxide, rhenium oxide, indium oxide) in an appropriate form such as powder, fiber, piece, net or porous plate, followed by shaping to give a positive electrode body.

when no carbonaceous material is incorporated, it may sometimes be difficult to smoothly remove molded product, as a positive electrode body made of a positive active material or its mixture with any non-carbonaceous electroconductive material, from a shaping mold in which the positive electrode body has been molded, without causing chipping at the periphery parts of the positive electrode body. In the case where such a drawback is noted, the compression molding for the manufacture of the positive electrode body may be carried out in the following manner. Thus, referring to FIG. 3, a tubular body 5 having an L-shaped or I-shaped cross section and a height nearly equal to that of the positive electrode body desired to shape is placed inside of a mold 6, particles of the positive active material 4 are charged therein and compression is applied thereto, whereby the positive electrode body mounted with the tubular body at the periphery parts is formed. Then, the positive electrode body 4 is taken out from the mold 6 by the aid of a pushing rod (not shown). Since the positive active material is not directly contacted with the mold at the periphery parts, no adhesion occurs between the positive active material and the mold, and the positive electrode body can be readily taken out without chipping. The said tubular body may be made of iron, nickel, stainless steel, fluororesin, polyacetal resin, high molecular weight polyetylene or the like.

Silver oxide has an electric resistance of about $10^7$ $\Omega.cm$. Therefore, when an electroconductive material is not incorporated, the internal resistance of the positive electrode body is considerably high. Such high internal resistance may produce insufficiency in discharge performances and various mechanical troubles when a cell manufactured therewith is employed for instruments with a high loading resistance such as a shutter speed regulating mechanism or an electronic lighter. In order to eliminate the deficiency, a metallic silver layer may be formed at the surface of the positive electrode body at least at the portions where a positive electrode terminal such as a positive can for accommodation of the positive electrode body is to be contacted.

The amount of the metallic silver layer to be provided on the surface of the positive electrode body may be preferably from about 20 to 70 mg/cm$^2$. In such case, the internal resistance is lowered, the open circuit voltage has less variations and the discharge capacity of the cell is decreased only slightly.

As stated above, the performances of the silver(II) oxide cell can be improved by the formation of a metallic silver layer on the surface of the positive electrode body. However, the metallic silver layer may be gradually decreased on storage of the silver(II) oxide cell so that its sufficient function may not be exerted. In order to prevent such decrease, the incorporation of an antioxidative, alkaline-resistant, water-repellent into the positive electrode body is effective. As the water-repellent, there may be used fluorine-containing resins such as polytetrafluoroethylene, polytrifluorochloroethylene, polyhexafluoropropylene and tetrafluoroethylene-hexafluoropropylene copolymer. Homopolymers of fluorinated compounds of the formula:

(wherein Rf is a straight or branched perfluoroalkyl group of 3 to 21 carbon atoms and R' is hydrogen or methyl) and copolymers of such fluorinated compounds with other polymerizable monomers such as acrylic acid and styrene are also utilizable. Some of the homopolymers and copolymers of the said fluorinated compounds are available on the market under the tradenames of "FC 706", "FC 721", "FX 900" (manufactured by Minnesota Mining & Mfg. Co.), "FP 84C" (manufactured by Sumitomo Chemical Co., Ltd.), etc. Among them, the use of "FP 84C" is particularly favorable. The amount of the water-repellent to be incorporated may be from about 0.1 to 10 % by weight, preferably from about 0.5 to 2 % by weight based on the weight of the positive electrode body. When, for instance, a metallic silver layer is formed at the surface of the positive electrode body containing a water-repellent "FP 84C" in a content of about 0.6 % by weight, the resulting silver(II) oxide cell shows the rise of the internal resistance of only 2 to 3 $\Omega$ even after storage at 60° C for 40 days.

In general, the positive electrode body is so compression molded so as to have a packing density of not less than about 5 g/cm$^3$, preferably not less than about 5.5 g/cm$^3$, but of not more than about 7 g/cm$^3$ for prevention of the excessive penetration of the electrolyte into the positive electrode body so as to contact with silver-(II) oxide therein.

Figure 4:
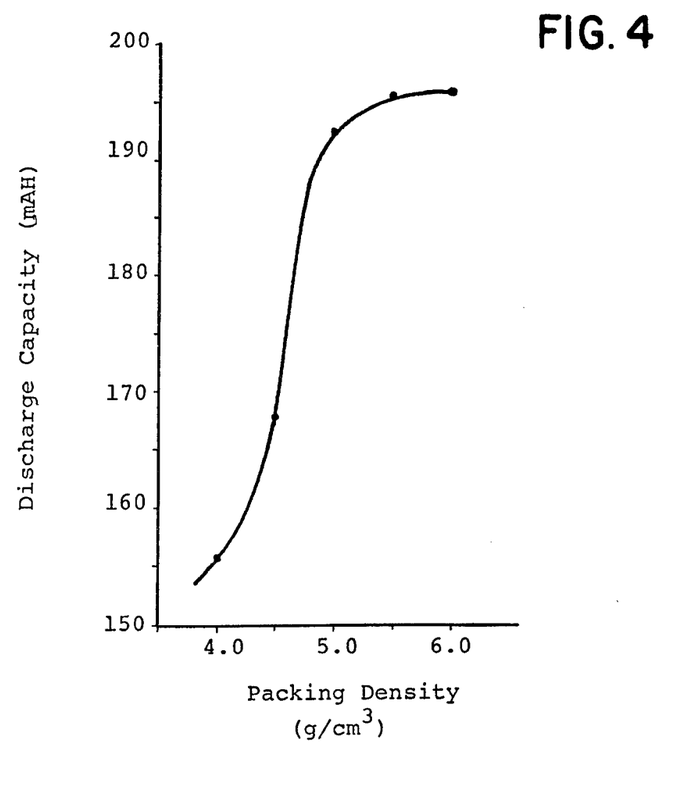
FIG. 4 shows the relationship of discharge capacity to packing density.

For instance, a silver(II) oxide cell manufactured by the use of a positive electrode body as prepared in the following manner shows the relationship of the discharge capacity with the packing density in FIG. 4: particles of the positive active material having about 10 % by weight of silver(I) oxide at the surface parts, comprising about 90 % by weight of particles of not less than about 1 $\mu$ in size and showing an average particle size of about 2 $\mu$ are compression molded to make a positive electrode body, and the positive electrode body is immersed in a 25% by weight aqueous solution of sodium hydroxide at 60° C for 40 hours.

The provision of the positive electrode body with the said high packing density is advantageous also when a metallic silver layer is formed at the surface by reducton, since the reduction occurs only near the surface and the thickness of the metallic silver layer thus formed is very thin. Thus, the loss of the discharge capacity due to the excessive conversion of silver(I) oxide into silver can be avoided.

As a separator for separating the positive electrode comprising the positive active material from the negative electrode comprising zinc, there may be used any conventional one. A semi-permeable membrane made of cellophane or polyvinyl alcohol is favorably used, since it can surely prevent the movement of the silver ions dissolved into the electrolyte at the positive electrode during the storage into the negative electrode.

However, the positive active material used in the present invention has a strong oxidizing activity, and the semi-permeable membrane may be sometimes oxidized and deteriorated to lose their desirable property when contacted on the positive electrode body for a long period of time. For prevention of such oxidization and deterioration of the semi-permeable membrane, the intervention of a microporous film made of polyolefin graft polymerized with acrylic acid or methacrylic acid thereon between the positive electrode body and the semi-permeable membrane is favorable. The microporous film may be prepared, for instance, by irradiating ionizing radiation onto a microporous film made of polyolefin (e.g. polyethylene, polypropylene, ethylene-propylene copolymer) to produce a sufficient amount of radicals, immersing the resultant film into a solution of acrylic acid or methacrylic acid and then subjecting the film in the immersion state to heating or radiation, followed by elimination of the polymers by-produced in the graft-polymerization. The grafting rate, which is calculated according to the following equation, may be usually from not less than about 20%, preferably from not less than about 50%, from the viewpoint of assuring a low electric resistance of the resulting microporous film:

Grafting rate (%) =

$$\frac{\text{Weight of acrylic acid or methacrylic acid grafted}}{\text{Weight of microporous film before grafting}} \times 100$$

The thus obtained microporous film may be sometimes not sufficient in water absorption. In such case, the film is preferably treated with an aqueous solution of an alkali metal hydroxide (e.g. sodium hydroxide, potassium hydroxide) to make the hydrogen atoms in the carboxyl groups substituted with the alkali metals. The resulting film has a good wettability and can make uniform the distribution of the electrolyte at the surface. In general, the substitution degree with the alkali metals is preferred to be not less than about 60 mol % of the total carboxyl groups. Still, the film has itself an adhesive property so that it may be adhered on the semi-permeable membrane without using a binding agent.

As the electrolyte, there may be any conventional one heretofore employed in silver(II) oxide cells. The use of an electrolyte essentially consisting of an aqueous solution of an alkali metal hydroxide (e.g. sodium hydroxide, potassium hydroxide) is preferred since the resulting cell shows a higher stability. In such electrolyte, the favorable concentration of the alkali metal hydroxide is usually within a range of from about 5 to 27% by weight.

When the concentration is higher than about 27% by weight, the production of the gas (O$_2$) is increased. For instance, the immersion of particles of the positive active material having about 10% by weight of silver(I) oxide at the surface parts in an alkaline electrolyte at 60° C for 240 hours produces the gas in an amount as shown in the following table:

| Electrolyte Concentration (% by weight) | Amount of gas produced (ml) | |
| --- | --- | --- |
|  | Sodium hydroxide | Potassium hydroxide |
| 5 | 0.10 | 0.12 |
| 10 | 0.15 | 0.17 |
| 20 | 0.32 | 0.35 |
| 27 | 0.41 | 0.43 |
| 30 | 0.70 | 0.79 |

As understood above, the concentration of not less than about 27% by weight is favorable for suppressing the decomposition of silver(II) oxide and the production of the gas therefrom. When, however, the concentration is lower than about 5% by weight, the ion conductivity of the electrolyte is inferior so that the internal resistance is increased. Further, in the case that the positive can is an iron can plated with nickel, rusts may be readily produced at the pinhole portions or the thin portions in the plated layer, resulting in the increase of the resistance at the contact parts between the positive can and the positive electrode body.

Practical and presently preferred embodiments of the present invention are illustratively shown in the following Examples.

EXAMPLE 1

To an aqueous solution of sodium hydroxide (1.2 mol/L) (1 L), an oxidizing agent (0.3 mol) was added, and an aqueous solution of silver nitrate (3 mol/L) (0.1 L) was dropwise added thereto, and stirring was continued at 80° C for 1 hour. The precipitated silver(II) oxide particles were collected by decantation, washed with water and dried. The resulting particles were compression molded to make a positive electrode. By the use of the thus prepared positive electrode, there was manufactured a silver(II) oxide cell of Type G12.

On the silver(II) oxide cell, the open circuit voltage, the discharge capacity until the terminal voltage lowered to 1.4 V and the discharge utilization of the positive active material were measured. The results are shown in Table 1.

Table 1

| Oxidizing agent | Open circuit voltage (V) | Discharge capacity (mAH) | Discharge utilization (%)* |
|---|---|---|---|
| $K_2S_2O_8$ | 1.85 | 215 | 99.5 |
| $KMnO_4$ | 1.57 | 116 | 50.0 |
| $NaClO_2$ | 1.86 | 200 | 92.6 |

Note:
Discharge utilization was calcuated according to the following equation:
$$\frac{\text{Discharge capacity}}{\text{Theoretical discharge capacity}} \times 100$$
The value 100% indicates that the perfect oxidation proceeded to give silver(II) oxide in a 100% yield.

EXAMPLE 2

Silver nitrate (1 mol) and potassium persulfate were reacted in the presence of sodium hydroxide (10 mol) in an aqueous medium at about 80° C for about 60 minutes, and then stirring was continued for 60 minutes. The silver nitrate and the sodium hydroxide were used in the form of aqueous solution respectively having the same concentrations as in Example 1. The precipitated product was collected by decantation, washed with water and dried to give silver(II) oxide.

Figure 5:
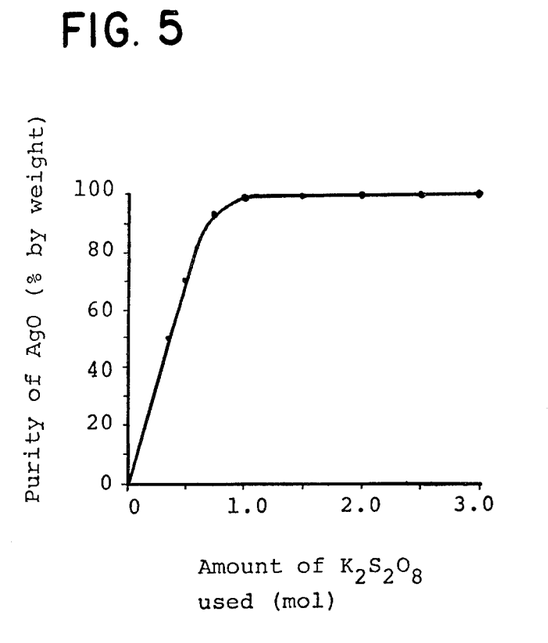
FIG. 5 shows the relationship of AgO purity to amount of $K_2S_2O_8$ used.
Figure 6:
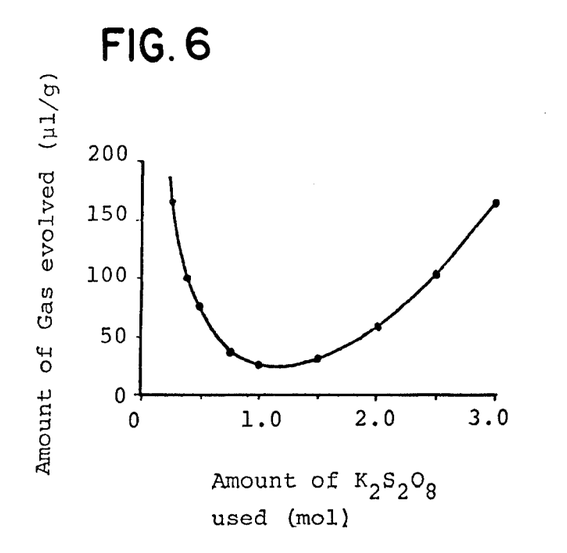
FIG. 6 shows the relationship between $K_2S_2O_8$ and gas evolved.

The relationship between the amount of potassium persulfate used and the purity of silver(II) oxide is shown in FIG. 5. The relationship between the amount of potassium persulfate used and the amount of the gas ($O_2$) evolved per day (in average) when the silver(II) oxide was immersed in a 25% by weight aqueous solution of sodium hydroxide at 45° C for 20 days is shown in FIG. 6.

From these results, it may be understood that the use of not less than about 0.7 mol of potassium persulfate to 1 mol of silver nitrate affords silver(II) oxide of high purity, and the use of about 0.7 to 2.0 mol of potassium persulfate to 1 mol of silver nitrate gives silver(II) oxide, which produces only a small amount of gas in an alkaline electrolyte.

EXAMPLE 3

Silver nitrate (1 mol) and potassium persulfate (0.7 to 2.0 mol) were reacted in the presence of sodium hydroxide in an aqueous medium at about 80° C for about 60 minutes, and then stirring was continued for 60 minutes. The silver nitrate and the sodium hydroxide were used in the form of an aqueous solution having the same concentrations as in Example 1. The precipitated product was collected by decantation, washed with water and dried to give silver(II) oxide.

Figure 7:
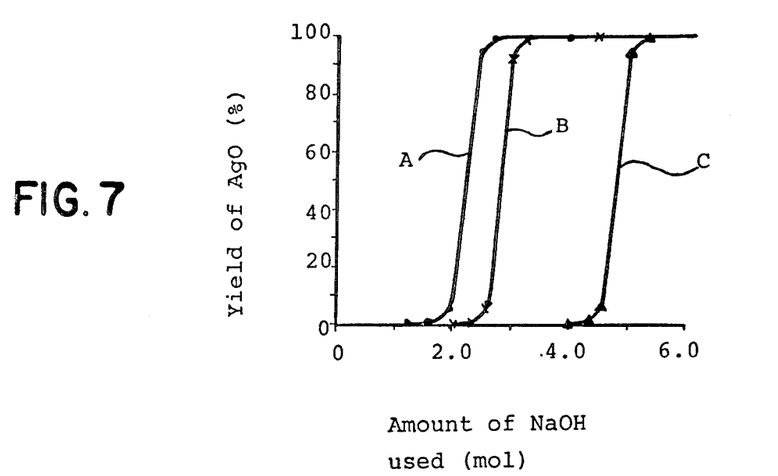
FIG. 7 shows the amount of NaOH used and yield of AgO.

The relationship between the amount of sodium hydroxide used and the yield of silver(II) oxide is shown in FIG. 7 wherein the curves (A), (B) and (C) correspond respectively to the case where silver nitrate (1 mol) was reacted with potassium persulfate (0.7 mol), the case where silver nitrate (1 mol) was reacted with potassium persulfate (1.0 mol) and the case where silver nitrate (1 mol) was reacted with potassium persulfate (2.0 mol).

From the above results, it is understood that, in order to produce silver(II) oxide in an excellent yield, sodium hydroxide is preferred to use in amounts of not less than about 2.4 mol, of not less than about 3 mol and of not less than about 5 mol respectively in the cases of (A), (B) and (C).

EXAMPLE 4

To a 1.2 M aqueous solution of sodium hydroxide (1000 ml) kept at 80° C, potassium persulfate (0.3 mol) was added, and gold hydroxide $Au(OH)_3$ (0.008 mol) was dissolved therein. A 0.3 M aqueous solution of silver nitrate (1000 ml) was dropwise added to the resulting solution, and stirring was continued at 80° C for about 60 minutes. The reaction mixture was then allowed to stand for about 60 minutes. The precipitated product was collected by decantation, washed and dried to give silver(II) oxide containing gold in a content of 1% by weight as powder.

The gold-containing silver(II) oxide particles were heated at 100° C in a nitrogen atmosphere for about 15 hours, whereby about 10% by weight of the silver(II) oxide at the surface parts of the particles was converted into silver(I) oxide to give a positive active material containing gold.

Similarly, there was produced a positive active material not containing gold, which comprised about 30 % by weight of Silver(I) oxide at the surface part and about 70% by weight of silver(II) oxide in the core part.

The amount of the gas ($O_2$) evolved per gram of the positive active material with the lapse of time when immersed in a 25% by weight aqueous solution of sodium hydroxide at 45° C is shown in Table 2.

Table 2

| Positive active material | Time immersed (Hrs) Amount of gas evolved (ml) | | | |
|---|---|---|---|---|
| | 200 | 400 | 600 | 800 |
| Gold contained | 0.03 | 0.05 | 0.07 | 0.10 |
| Gold not contained | 0.10 | 0.30 | 0.45 | 0.52 |

From the above results, it is understood that the presence of gold in the positive active material can suppress the generation of the gas.

EXAMPLE 5

Sodium hydroxide (8 g) and a 38% by weight aqueous solution of glycerol having a specific gravity of about 1.1 and a viscosity of about 2.9 cps (0.6 ml) were added to water (500 ml), and particles of silver(II) oxide (10 g) prepared as in Example 1 (using potassium persulfate) were added thereto. The resulting mixture was stirred at room temperature for 60 minutes, whereby reduction proceeded to give silver(II) oxide particles having about 30% by weight of silver(II) oxide at the surface parts (referred to as "D").

Sodium hydroxide (8 g) and glucose (320 mg) were added to water (500 ml), and particles of silver(II) oxide (10 g) were added thereto. The resulting mixture was stirred at room temperature for 60 minutes, whereby reduction proceeded to give silver(II) oxide particles having about 30% by weight of silver(II) oxide at the surface parts (referred to as "E").

In a nitrogen atmosphere, particles of silver(II) oxide were agitated at room temperature for 6 minutes, during which irradiation was carried out with a 500 W photographic lamp. As a result, there were obtained silver(II) oxide particles having about 30% by weight of silver(I) oxide at the surface parts (referred to as "F").

Reduction of particles of silver(II) oxide with an aqueous solution of formaldehyde gave silver(II) oxide particles having about 30% by weight of silver(I) oxide at the surface parts (referred to as "G").

Particles of silver(II) oxide were heated at 120° C for 9 hours in a nitrogen atmosphere, whereby the thermal decomposition took place to give silver(II) oxide particles having about 30% by weight of silver(I) oxide at the surface parts (referred to as "H").

The above prepared positive active material (1 g) was immersed in a 25% by weight aqueous solution of sodium hydroxide at 45° C for one day, and the amount of the gas ($O_2$) produced therefrom was measured. Separately, the said positive active material (0.5 g) was compression molded under a pressure of 5 t/cm$^2$ to give a positive electrode body in a round plate shape having a packing density of 5.5 g/cm$^3$, and its discharge capacity was measured.

The results are shown in Table 3.

Table 3

| Positive active material | Amount of gas produced (ml) | Discharge capacity (mAH) |
|---|---|---|
| D | 0.019 | 185 |
| E | 0.018 | 186 |
| F | 0.021 | 184 |
| G | 0.025 | 130 |
| H | 0.027 | 175 |

EXAMPLE 6

The following silver(II) oxide cells Model G13 (Model SR 44) were prepared:

Cell using the positive active material prepared as in Example 5 (H) (referred to as "I");

Cell using the positive active material prepared as in Example 5 (H) and then treated with boiling water for 3 hours (referred to as "J");

Cell using the positive active material prepared as in Example 5 (H) and then treated with a 40% by weight aqueous solution of sodium hydroxide at 40° C for 3 hours, followed by washing with water (referred to as "K").

Each of the cells was allowed to stand at 60° C for 40 days and then discharged with a loading resistance of 6.5 kΩ. The time until the terminal voltage showed 1.4 V was recorded.

The results are shown in Table 4.

Table 4

| Silver(II) oxide cell | Time (Hr) |
|---|---|
| I | 450 |
| J | 720 |
| K | 724 |

EXAMPLE 7

Figure 8:
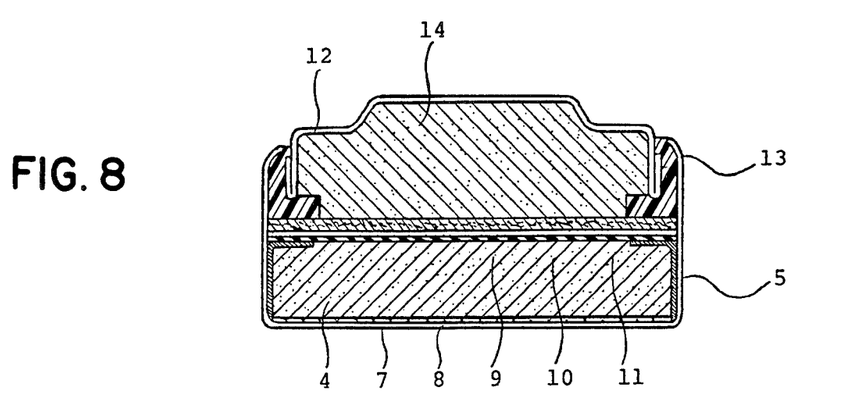
FIGS. 8 and 9 are a schematic sectional views of silver(II) oxide cells.

A schematic sectional view of an embodiment of the silver(II) oxide cell of the invention is shown in FIG. 8.

Particles of silver(II) oxide as prepared in Example 1 (using potassium persulfate) are heated at about 100° C in a nitrogen atmosphere for about 15 hours, whereby particles comprising 90% by weight of silver(II) oxide at the core parts and 10% by weight of silver(I) oxide at the surface parts are obtained.

Particles of the positive active material (3) prepared as above (0.5 g) are compression molded (without incorporating any electroconductive aid therein) under a pressure of about 5 ton/cm$^2$ to give a molded product (i.e. a positive electrode body) (4) in a round plate shape of 11.8 mm in diameter and 0.97 mm in thickness, which has a packing density of about 5.6 g/cm$^3$. Since the compression molding is carried out by the use of a tubular body as hereinabove described, the resulting molded product is mounted with the tubular body 5.

The molded product 4 is immersed in a 30 % by weight aqueous solution of potassium hydroxide, and fine particles of a reductive metal (e.g. Zn, Cd, Cu) are dropwise added thereto while stirring so as to cover the upper surface of the molded product therewith and allowed to stand at room temperature for about 15 minutes. Then, the molded product is taken out, washed with water and dried to obtain a positive electrode element having a metallic silver layer 7 at one surface.

Into a positive can 8 made of iron and plated with nickel on the surface, a 35 % by weight aqueous solution of potassium hydroxide (10 μl) as an electrolyte is charged, and the positive electrode element is inserted therein in such a manner that the metallic silver layer 7 of the positive electrode element is brought into contact with the bottom of the positive can 8, whereby the positive electrode body 4 is wet with the electrolyte. On the positive electrode body 4, a microporous film 9 made of polyethylene graft polymerized with acrylic acid or methacrylic acid thereon, a semi-permeable membrane 10 made of cellophane or polyvinyl alcohol and an absorptive paper 11 made of polyolefin fibers or of Vinylon fibers and rayon fibers are placed in this order.

A negative terminal plate 12 is fit in a gasket 13 made of a polyamide or polyolefin resin, having a section of L-letter form. Inside the negative terminal plate 12, a negative active material 14 comprising amalgamated zinc powder, sodium polyacrylate and a 35 % by weight aqueous solution of potassium hydroxide in a weight ration of 100 : 2 : 59 is filled in. The gasket 13 is fit in the opening of the positive can 8, and the opening end of the positive can 8 is bent inward, whereby a silver (II) oxide cell as shown in FIG. 8 is obtained.

EXAMPLE 8

Figure 9:
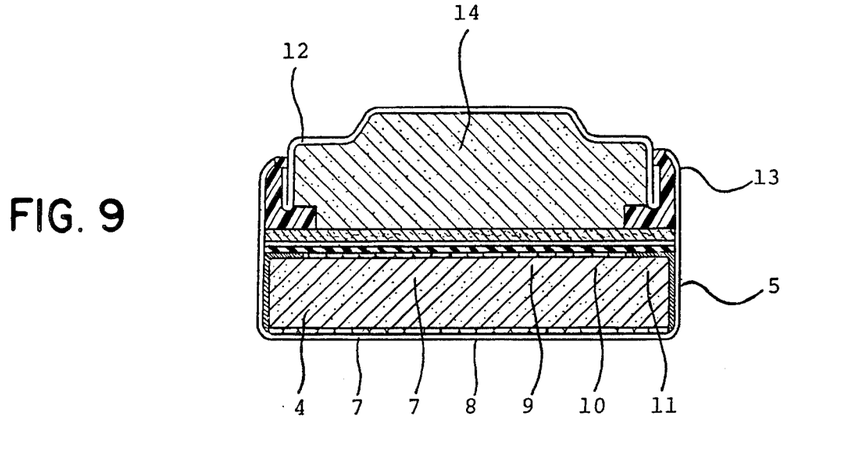

A schematic sectional view of another embodiment of the silver(II) oxide cell of the invention is shown in FIG. 9.

The assembly of a cell is carried out as in Example 7 but using the molded product 4 which has no metallic silver layer on its surface. Then, the cell is connected with a loading resistance of 1 to 3 Ω and subjected to preliminary discharge for a period of 30 to 80 seconds, whereby a metallic silver layer is formed on each of the lower and upper surfaces of the molded product 4, which contact respectively on the positive can 8 and on the microporous film 9, to give a silver(II) oxide cell as shown in FIG. 9.

In the above Example, the assembly of the silver(II) oxide cell may be carried out by the use of a positive electrode element prepared by subjecting the molded product to preliminary discharge so as to form metallic silver layers on the surfaces instead of subjecting the assembled silver(II) oxide cell using the molded product having no metallic silver layer on the surface to preliminary discharge.

Further, the formation of a metallic silver layer(s) on the surface(s) of the molded product may be achieved by treating the molded product with a solution comprising a reducing agent such as formaldehyde of glucose, or with a reductive gas comprising hydrogen gas.

The ranges of the variations of the internal resistance in the silver(II) oxide cell (Type G12) as prepared in Example 8 (L) and the corresponding silver(II) oxide cell before subjecting to preliminary discharge (M) are shown in Table 5.

Table 5

| Silver(II) oxide cell | Internal resistance ($\Omega$) |
|---|---|
| L | 3 – 5 |
| M | 10 – 15 |

Figure 10:
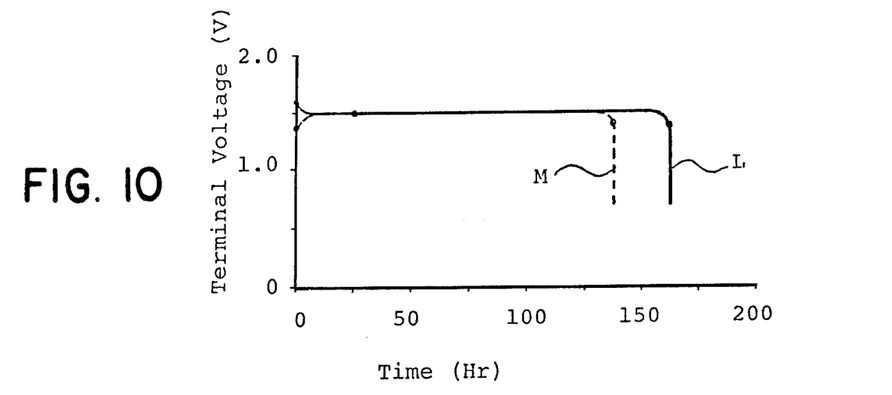
FIGS. 10 and 11 show discharge characteristics of the AgO cell.
Figure 11:
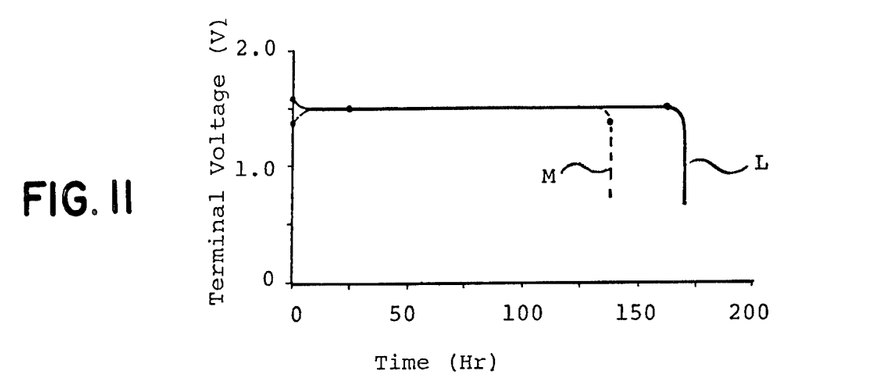

The loading discharge characteristics of the silver(II) oxide cell (L) and (M) when connected with a loading resistance of 500 $\Omega$ and discharged at 20° C and when connected with a loading resistance of 6.45 k$\Omega$ and discharged at $-10°$ C are shown respectively in FIGS. 10 and 11.

From the results in Table 5 and FIGS. 10 and 11, it may be understood that the formation of a metallic silver layer on the surface of the molded product at the portion which is contacted with a positive terminal material gives a low internal resistance and good discharge performances even under heavy loading or at low temperatures.

EXAMPLE 9

Acrylic acid was graft polymerized onto a microporous film made of low density polyethylene (thickness, about 25 $\mu$; pore size, about 10 to 15 Å; density, about 0.91).

The electric resistance of the resulting grafted microporous film in a 40% by weight aqueous solution of potassium hydroxide was measured. The results are shown in Table 6.

Table 6

| Grafting rate (%) | Electric resistance (m$\Omega$/in$^2$) |
|---|---|
| 10 | 1500 |
| 20 | 98 |
| 50 | 27 |
| 70 | 20 |
| 100 | 9 |

The grafted microporous film as obtained above (grafting rate, 45%) was treated with an aqueous solution of a metal salt at room temperature for 24 hours. The substitution degree of the hydrogen atoms in the carboxyl groups present in the grafted microporous film with the metal atoms and the water absorption of the resulting film is shown in FIG. 12, wherein the curves (N), (O), (P) and (Q) represent respectively the relationships in the cause of the metal salt being a potassium salt, a sodium salt, a lithium salt and a calcium salt.

Figure 12:
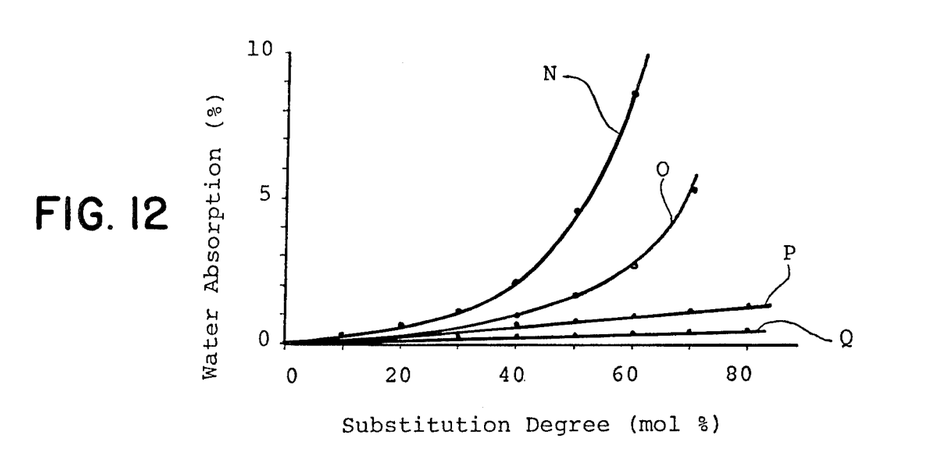
FIG. 12 shows water absorption of the grafted microporous film.

From the results as shown in FIG. 12, it is understood that the film having the substitution degree with potassium or sodium atoms of not less than about 60 mol % has a high water absorption.

What is claimed is:

1. A silver(II) oxide cell which comprises a positive electrode comprising a shaped body of silver(II) oxide as a positive active material, a negative electrode comprising a negative active material and an alkaline electrolyte, characterized in that the shaped body is a molding product of a composition comprising particles of which each particle comprises a core part of silver(II) oxide and a surface part of silver(I) oxide integrally and continuously provided around the core part.

2. The silver(II) oxide cell according to claim 1, wherein the weight ratio of the silver (II) oxide and the silver(I) oxide is from about 70 : 30 to 90 : 10.

3. The silver(II) oxide cell according to claim 1, wherein the particle additionally comprises gold.

4. The silver(II) oxide cell according to claim 3, wherein the gold content is not more than about 1% by weight based on the weight of the particle.

5. The silver(II) oxide cell according to claim 1, wherein the particles comprise those of from about 1 $\mu$ to 10 $\mu$ in particle size in a content of not less than about 90% by weight.

6. The silver(II) oxide cell according to claim 5, wherein the particles have an average particle size of about 1.5 to 2.5 $\mu$.

7. The silver(II) oxide cell according to claim 1, wherein the particles are those prepared by oxidizing a silver salt with a persulfate in an aqueous solution of alkali, the amounts of the persulfate and of the alkali being respectively from about 0.7 to 2.0 mol and from about 2.4 to 5.0 mol to 1 mol of the silver salt, and converting the resultant silver(II) oxide particles at the surface parts into silver(I) oxide.

8. The silver(II) oxide cell according to claim 7, wherein the conversion is achieved by thermal decomposition at 60° to 150° C.

9. The silver(II) oxide cell according to claim 7, wherein the conversion is achieved by reduction with glycerol or glycose in an alkaline solution.

10. The silver(II) oxide cell according to claim 1, wherein the molded product is one prepared by immersing the particles in boiling water and, after they are removed from the water, the resulting particles are compression molded.

11. The silver(II) oxide cell according to claim 1, wherein molded product is the one prepared by compression molding the particles, immersing the shaped body in boiling water and removing the treated body from the water.

12. The silver(II) oxide cell according to claim 1, wherein the molded product is one prepared by immersing the particles in an aqueous solution of an alkali metal hydroxide or an alkaline earth metal hydroxide and, after they are removed from the solution, the resulting particles are compression molded.

13. The silver(II) oxide cell according to claim 1, wherein the molded product is one prepared by compression molding the particles, immersing the shaped body in an aqueous solution of an alkali metal hydroxide or an alkaline earth metal hydroxide and removing the treated body from the solution.

14. The silver(II) oxide cell according to claim 1, wherein the molded product is one prepared by compression molding of the particles alone.

15. The silver(II) oxide cell according to claim 1, wherein the molded product is one prepared by compression molding of the particles in admixture with a non-carbonaceous electroconductive material.

16. The silver(II) oxide cell according to claim 1, wherein the molded product is one prepared by compression molding of the particles in admixture with an anti-oxidative and alkali-resistant, water-repelling material.

17. The silver(II) oxide cell according to claim 16, wherein the water-repellent is a fluorine-containing material.

18. The silver(II) oxide cell according to claim 1, wherein the molded product is provided with a metallic silver layer thereon at least at the parts which are contacted to a positive terminal material.

19. The silver(II) oxide cell according to claim 18, wherein the metallic silver layer is formed in an amount of about 20 to 70 mg/cm$^2$.

20. The silver(II) oxide cell according to claim 1, wherein the molded product has a packing density of from about 5 to 7 g/cm$^3$.

21. The silver(II) oxide cell according to claim 1, wherein the molded product is wetted with an alkaline solution containing an alkali in a concentration of from about 5 to 27% by weight, as the electrolyte.

22. A positive electrode element for a silver(II) oxide cell which comprises a molded product prepared by compression molding particles to shape in a plate having a packing density of from about 5 to 7 g/cm$^3$, each of said particles comprising a core part of silver(II) oxide and a surface part of silver(I) oxide integrally and continuously provided thereon.

* * * * *